US009836188B2

(12) United States Patent
Hasan

(10) Patent No.: US 9,836,188 B2
(45) Date of Patent: Dec. 5, 2017

(54) WEB BUTTON LISTING MULTIPLE DESCRIPTIONS IN A SINGLE BUTTON

(71) Applicant: Qamar Hasan, Signal Hill, CA (US)

(72) Inventor: Qamar Hasan, Signal Hill, CA (US)

( * ) Notice: Subject to any disclaimer, the term of this patent is extended or adjusted under 35 U.S.C. 154(b) by 0 days.

(21) Appl. No.: 15/099,551

(22) Filed: Apr. 14, 2016

(65) Prior Publication Data

US 2017/0300185 A1   Oct. 19, 2017

(51) Int. Cl.

| | |
|---|---|
| *G06F 3/0482* | (2013.01) |
| *G06F 3/0484* | (2013.01) |
| *G06F 17/30* | (2006.01) |
| *H04L 29/08* | (2006.01) |
| *G06T 11/60* | (2006.01) |
| *G06F 7/08* | (2006.01) |

(52) U.S. Cl.
CPC ........ *G06F 3/0482* (2013.01); *G06F 3/04842* (2013.01); *G06F 7/08* (2013.01); *G06F 17/30867* (2013.01); *G06T 11/60* (2013.01); *H04L 67/02* (2013.01)

(58) Field of Classification Search
CPC ...... G06F 3/0482; G06F 3/04842; G06F 7/08; G06F 17/30867; G06F 17/30861; G06F 17/30864; G06T 11/60; H04L 67/02
See application file for complete search history.

(56) References Cited

U.S. PATENT DOCUMENTS

| | | | | |
|---|---|---|---|---|
| 6,317,783 B1 * | 11/2001 | Freishtat | ........... | G06F 17/30867 707/999.01 |
| 7,634,228 B2 * | 12/2009 | White | ................ | G06Q 30/0267 455/3.05 |
| 7,774,388 B1 * | 8/2010 | Runchey | ........... | G06F 17/30861 704/9 |
| 9,015,147 B2 * | 4/2015 | Curtis | ............... | G06F 17/30749 707/721 |
| 2004/0034520 A1 * | 2/2004 | Langkilde-Geary | | G06F 17/2881 704/1 |
| 2004/0098357 A1 * | 5/2004 | Higgins | ................... | G06N 5/02 706/45 |
| 2004/0267735 A1 * | 12/2004 | Melham | ................. | G06Q 30/02 |
| 2006/0075019 A1 * | 4/2006 | Donovan | .......... | G06F 17/30867 709/203 |
| 2007/0150470 A1 * | 6/2007 | Brave | ............... | G06F 17/30867 |
| 2008/0147653 A1 * | 6/2008 | Collier | ............. | G06F 17/30864 |
| 2008/0189253 A1 * | 8/2008 | Oliver | ............... | G06F 17/30675 |
| 2008/0209351 A1 * | 8/2008 | Macadaan | ............ | G06F 3/0482 715/762 |
| 2008/0294584 A1 * | 11/2008 | Herz | ................. | G06F 17/30867 706/46 |

(Continued)

FOREIGN PATENT DOCUMENTS

| | | | | |
|---|---|---|---|---|
| WO | WO 2006034290 A2 * | 3/2006 | ....... | G06F 17/30867 |
| WO | WO 2015054551 A1 * | 4/2015 | ....... | G06F 17/30867 |

*Primary Examiner* — Amy M Levy

(57) ABSTRACT

A method to make website buttons more efficient at displaying content. Mathematical, tagging, and similar methods are used to find which web contents can be described by more than one description. The plurality of description are grouped together and presented in a single descriptive website button. Upon clicking of the descriptive-button, users are presented with list of web contents that specifically meet the plurality of descriptions listed on the website button.

7 Claims, 7 Drawing Sheets

(56) References Cited

U.S. PATENT DOCUMENTS

| | | | |
|---|---|---|---|
| 2009/0089652 A1* | 4/2009 | Chi | G06F 17/30873 |
| | | | 715/205 |
| 2009/0327275 A1* | 12/2009 | Walker | G06F 17/30893 |
| 2010/0057698 A1* | 3/2010 | Prasad Kantamneni | |
| | | | G06F 17/3097 |
| | | | 707/E17.015 |
| 2011/0035288 A1* | 2/2011 | Clyne | G06Q 30/02 |
| | | | 705/14.71 |
| 2011/0276396 A1* | 11/2011 | Rathod | G06F 17/30867 |
| | | | 705/14.49 |
| 2012/0078961 A1* | 3/2012 | Goenka | G06F 17/30893 |
| | | | 707/778 |
| 2013/0262242 A1* | 10/2013 | Tateo | G06Q 30/0276 |
| | | | 705/14.72 |
| 2015/0019380 A1* | 1/2015 | Lin-Hendel | G06F 3/0482 |
| | | | 705/26.62 |
| 2015/0206070 A1* | 7/2015 | Kulkarni | G06N 99/005 |
| | | | 706/12 |

* cited by examiner

WEB BUTTON LISTING MULTIPLE DESCRIPTIONS IN A SINGLE BUTTON

FIELD OF THE INVENTION

The present invention relates to a website button, and more particularly to a system and method for presenting users specific information utilizing a single button object.

BACKGROUND OF THE INVENTION

Websites and web applications today show content applicable to a broad variety of users. To help a user reach information of interest to them, websites make buttons that are labeled by a single description. For example a news website will have a single button for each of its sections with the buttons labeled Technology, Sports, Finance, Politics, and so on. Or an apparel shopping website will have a single button for each of its sections with the buttons labeled outdoor clothing, shoes, and clothing accessories. Each of these descriptions is describing a single item. After a user clicks on one of these buttons, the user can further go into the page the user is interested in seeing by using the next set of buttons. For example, after entering the Finance section of a news website, the user can choose from sections like Bonds, Market, Retirement, and so on.

As the usage of the Internet increases there is an increased amount of data about who the users are, what are the users are reading or buying or recommending, and when the users are doing various actions. With the recent improvements in large scale data logging, and large scale data analysis, there is opportunity to improve the buttons on the website to have more detailed and personalized information for users to choose. Such an improvement would improve a users website experience which in-turn increases the probability a user would visit the website again.

For example, a 40 year old from the state of New York may visit a news website in search of finance news. News publishers help the website user reach the finance news web content by having a button labeled "Finance" on their website. Upon clicking of this button the user is displayed web content relevant to or tagged to "Finance". Although the user is presented finance news, the majority of the web content presented is not relevant to a 40 year old from New York. Moreover, when visiting the news website, the user does not reach finance articles relevant to a 40 year old from New York in a single click. The lack of relevant content and the lack of ease to quickly reach the web content may disappoint the user which in turn reduces the chance of the user visiting the news publisher's website again.

What is needed is an improved method for users to reach information on websites. The method should address and eliminate the disadvantages presented above. The method should take advantage of the data logging and data processing technology available today. The method should improve a website user experience.

The present invention addresses such a need. The present invention gives users the ability to reach specific information very quickly. Additionally, the present invention is able to personalize website buttons in a lot of depth such that users are able to make much more informed choices about the web content they want to view. Such an advantage improves website user experience.

SUMMARY OF THE INVENTION

The intention of the following summary is to introduce a selection of the concepts in a simplified form that are further described in the Detailed Description section. This Summary is not intended to identify all of the features or all of the key features.

A website hosts web content. When a user visits a specific web content, the website stores information about the user. Some of the information, such as users IP address, can be extracted using means known to those skilled in the art. Other information about the user like gender, age, interests, countries visited, fashion preference, and so on, are either stated by the user or are implied by the user. The various types of information (either extracted, stated, or implied) about the user are logged in a database.

A second database logs the interactions a user has with the website. A website may have one user or it may have more than one user. Indeed it may have millions of users. Website interaction from every user visiting the website is logged in a database.

A third database logs the details about all the web content in a website. Details about the web content can be items like taxonomy of the content displayed, key words of the content displayed, date the content was updated, colors of the image on the website, and so on.

In summary, three databases have been established. One database has information about a user. A second database has a log of who is seeing which web content. A third database has a log of what various web contents are about. Using various methods, including mathematical and computer methods, the data can be analyzed in within a single database or in all of the databases together, to identify which web content is relevant to a descriptive-group. A descriptive-group is described as having more than one description. A description could be things like age, gender, location, type of apparel, color, cost of item, taxonomy categorization, and so on. A non-exhaustive list of examples of descriptive-group are: "Outdoor winter clothing popular with females in New York", "30 to 40 year olds in the finance industry working in New York", "International Law students graduating on the West Coast".

A non-exhaustive list of examples of mathematical or computer methods that can identify descriptive-groups are: k-means clustering, multinomial regression, modal or aggregate count analysis, and many other methods.

The descriptive-group need not be labeled in a cohesive manner. For example, a descriptive-group could be labeled in a cohesive manner as "30 to 40 year olds in the finance industry working in New York". This group could also be labeled as a non-cohesive manner as "Min 30 year old, Max 40 year old, Finance Industry, Live in New York". Those skilled in the art would now that there are many such ways to group descriptions together to describe a descriptive-group.

Various methods identify which web content is relevant to a single descriptive-group. These web contents are associated with a single website button which describes that descriptive-group. Such a button will be referred to herein as a descriptive-button. For example, a descriptive-button in a news website could be "Finance news popular with 30 to 40 year olds in the finance industry in New York".

If a user clicks on that single website button, the user is presented with various finance articles that have been read by 30 to 40 year olds in the finance industry in New York. The news maybe presented in ranked form, for example, the most popular article first, or it may be presented in a non-sorted form, or it may be presented in many other methodologies and combinations.

By using descriptive-buttons on websites a user's website visit can become more efficient as users are able to reach more relevant information quickly and without clicking on multiple buttons or filters. Additionally, descriptive-buttons can be personalized such that users are presented with choices they are most concerned about and with choices that are most relevant to them.

BRIEF DESCRIPTION OF THE DRAWINGS

The foregoing summary, as well as the following detailed description of the invention, is better understood when read in conjunction with the appended drawings. For the purpose of illustrating the invention, exemplary embodiments of the invention are shown in the drawings. However, the invention is not limited to the specific methods and components disclosed herein.

DETAILED DESCRIPTION OF THE INVENTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Figure 1:
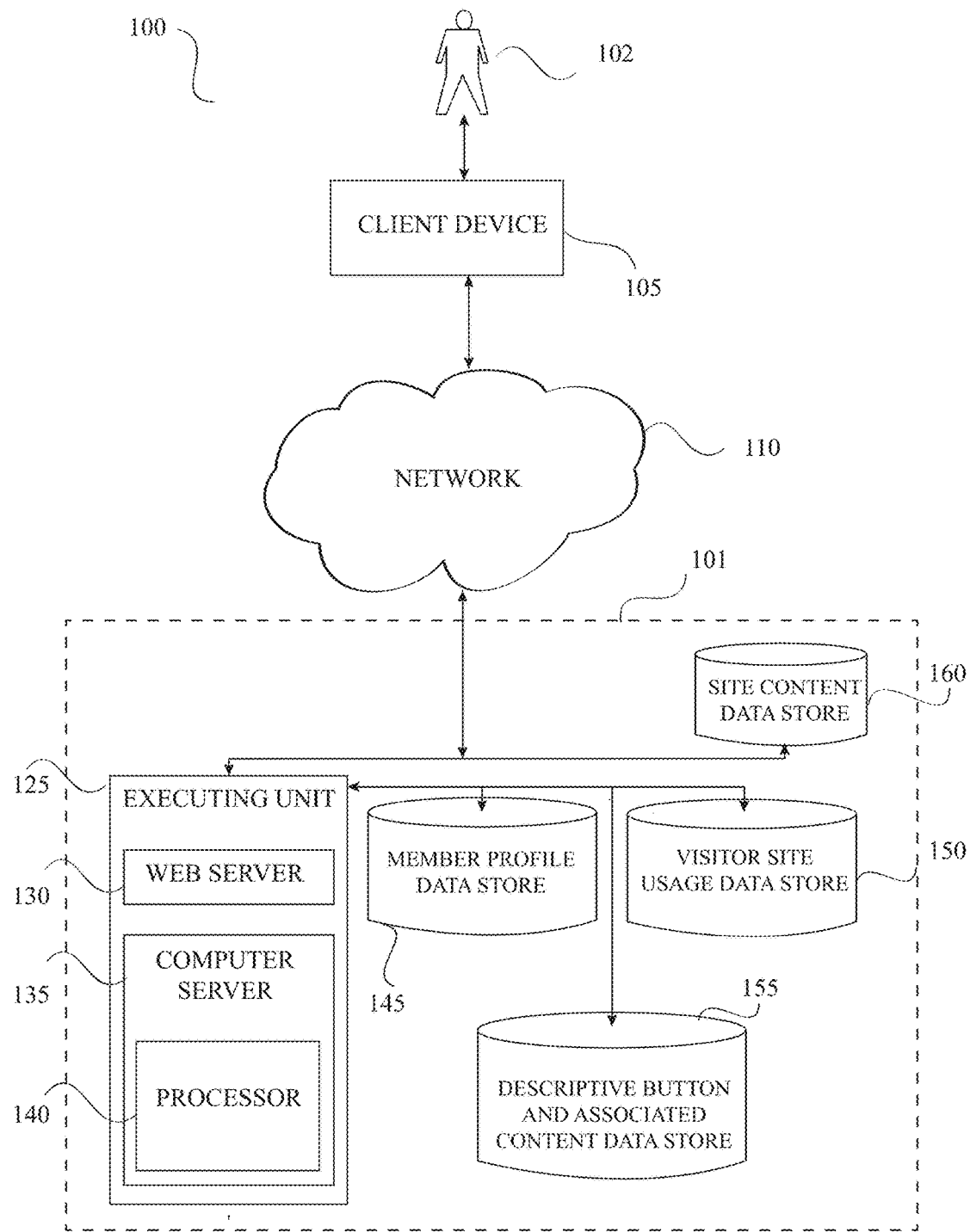
FIG. 1 illustrates an operating environment in which the methods of the present invention may be implemented.

FIG. 1 illustrates an operating environment of a system 100 that operates in accordance with one embodiment of the present invention. As shown in FIG. 1, client device 105 is able to present user interface (UI) displays, the client device 105 being connected to a computing system 101 via network 110. Although, only one client device is shown in FIG. 1, it would be obvious to those skilled in the art that there can be plurality of client devices 105 connected to the computing system 101 through the network 110. The client device 105 can be any device capable of presenting data and having one or more input and display devices, including, but not limited to, personal computers, server computers, mobile devices, tablets, hand-held or laptop devices, smart phones or personal digital assistants. As used herein, the term "Internet" generally refers to any collection of distinct networks working together to appear as a single network such to a user. The term refers to the so-called world wide "network of networks" that is connected to each other using the Internet protocol (IP) and other similar protocols. As described herein, the exemplary public network 110 of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1. The components appearing in the computing system 101 refer to an exemplary combination of those components that would need to be assembled to create the infrastructure in order to provide the tools and services contemplated by the present invention. As will be apparent to one skilled in the relevant art(s), all of components "inside" of the computing system 101 may be connected and may communicate via a wide or local area network (WAN or LAN).

The computing system 101 includes an application server 125 (hereinafter referred to as executing unit 125), a member profile data store 145, a visitor site usage data store 150, a descriptive button and associated content data store 155 and a site content data store 160. The executing unit 125 comprises a web server 130 and a computer server 135 that serves as the application layer of the present invention. It would be obvious to any person skilled in the art that, although described herein as the data being stored in different data stores, a single data store with necessary partitions can also store the various member profile data, visitor site usage data, descriptive button and associated content data and site content data.

Internet users visit websites to look for information. Websites provide buttons to help the user quickly reach the information the user is interested in. The buttons on a website describe the type of content which will appear if the user selects that button. In the ensuing description, the terms "website button" or "web button" or "button" are used to refer any type of buttons, widgets, icons, links or any other graphical control elements provided on a graphical user interface through which a user can trigger an event. Example of graphical user interface includes, but not limited to, web pages of websites rendered through a web browser or through any other application on client devices such as desktop computers, laptop computers, mobile telephones, tablets, smart phones etc.

The Web server 130 is a system that sends out Web pages in response to Hypertext Transfer Protocol (HTTP) or similar protocol requests from remote browsers (e.g. browser from the client devices 105). That is, the Web server 130 provides the User Interface (UI) or Graphical User Interface (GUI) to users of the computing system 101 in the form of Web pages on client device 105.

The computer server 135 may include one or more processors 140, a random access memory (RAM) (not shown in figure) and for temporary storage of information and/or instructions, and a read only memory (ROM) (not shown in figure) for permanent storage of information and/or instructions executable by the one or more processors 140. Computer server 135 may be generally controlled and coordinated by an operating system software. The operating system controls allocation of system resources and performs tasks such as processing, scheduling, memory management, networking, and I/O services, among things.

Although the description of the computer server 135 may refer to terms commonly used in describing particular computer servers, the description and concepts equally apply to other processing systems, including systems having architectures dissimilar to that shown in FIG. 1.

Figure 2:
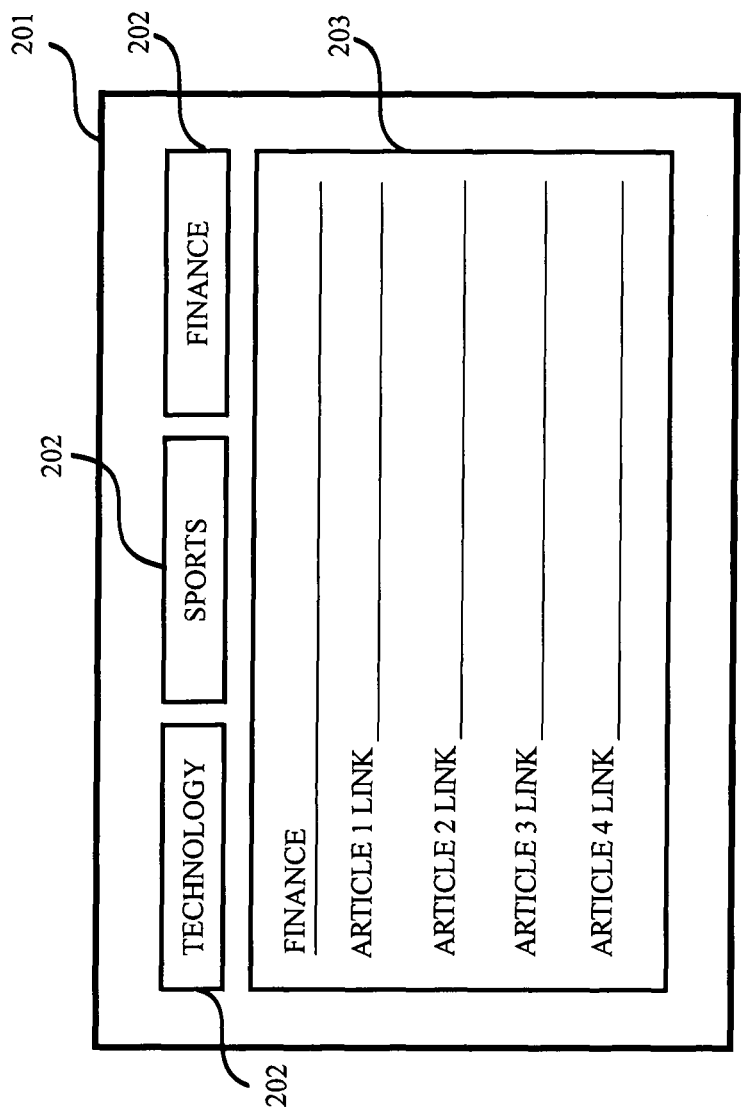
FIG. 2 illustrates an exemplary view of a web page with web buttons of prior art system.

FIG. 2 illustrates an exemplary view of a web page 201 with multiple buttons 202, the buttons 202 being shown in accordance with the features of commonly known web buttons of prior art. Although, for the sake of explanation the web page illustrated in FIG. 2 is considered to be that of a news web site, the inventive concept of the present invention can be applied to any web site. Typically, a news website would contain multiple buttons 202 on its web pages to help users navigate to the desired web content. These buttons 202, as shown in FIG. 2, have single textual description such as "Technology", "Sports" and "Finance" to denote the web content to which a user would be lead if clicked or triggered. For example, if the "Finance" web button 202 is clicked, then web contents related to finance, depicted by Article 1 Link to Article 4 Link, would appear on the reading pane 203 as shown in FIG. 2. The conventional web buttons 202, with single description or keywords ("Finance" in this case), do not facilitate users to navigate to more specific web contents related to finance in which the user may be interested. Rather, upon clicking of the conventional "Finance" button 202, usually the most recent or popular finance web content appears on the reading pane 203 in which the user may not necessarily be interested.

In accordance with a preferred embodiment of the present invention, a single button can be made to lead a user to specific contents on the web which may be more relevant to the user. To help users easily identify the buttons relevant to them, the buttons can be made to include more than one description or keyword which can more specifically describe the content to which the button is related. For example, reference to FIG. 3A, an exemplary descriptive button 300 with the textual description "Popular Retirement News in the Finance Section" 302, in accordance with an embodiment of the present invention, is more specific about the web content to which it relates than the conventional button 202 as shown in FIG. 2 with just one broad keyword "Finance". For the user it is easier to navigate directly to the web content relevant to the user through the button 300 for its more descriptive text than through the button 202. Descriptive Button 300 of the present invention contains multiple descriptions in a single button. For example, Descriptive Button 300 not just contains the description "Finance" but it also contains another description "Retirement". According to the preferred embodiment of the present invention, a single website button like button 300 of FIG. 3A, with multiple descriptions (e.g. descriptions "Finance" and "Retirement" combined in the present example), can present users in a single action more specific and personal information. Reducing multiple actions into a single action reduces network traffic, allows the user to reach more specific information quickly, and improves the user's website experience. The more the number of descriptions included in the button, the more accurate a button can become at describing the most relevant links and content associated.

Descriptions used to denote a button can be a variety of things. A non-exhaustive list of descriptions could be Library of Congress Subject Headings, cities, countries, gender, numbers, colors, price, university, level of education and so on. Combinations of more than one description or keywords that are grouped together can be called a Descriptive Group. A button that displays that Descriptive Group as a single website button 300 in accordance with a preferred embodiment of the present invention is referred to as a Descriptive Button 300 hereinafter. When users click a Descriptive-Button 300 they are shown one or more website-links related to the content described by that Descriptive-Group.

Figure 3A:
FIG. 3A illustrates an exemplary descriptive button with textual description in accordance with an embodiment of the present invention.
Figure 3B:
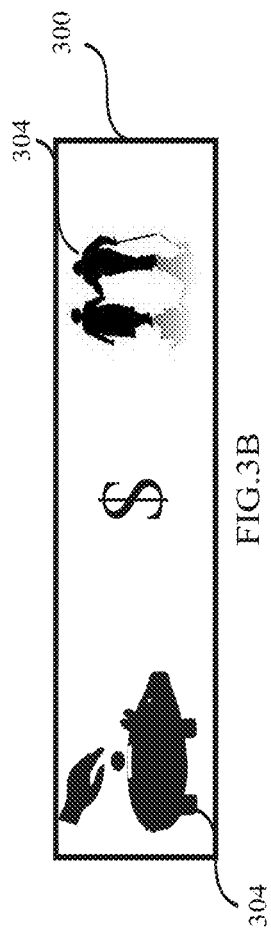
FIG. 3B illustrates an exemplary descriptive button with icons to represent descriptive groups in accordance with an embodiment of the present invention.
Figure 3C:
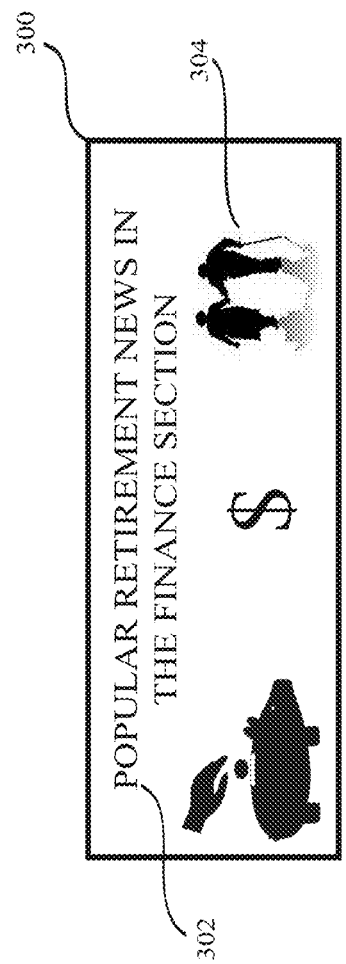
FIG. 3C illustrates an exemplary descriptive button with textual description and icons in accordance with an embodiment of the present invention.

Reference to FIG. 3B, in some embodiments of the present invention, the Descriptive-Groups can also be denoted through icons or images or graphical representations 304 in a Descriptive Button 300 instead of textual description 302 as shown in FIG. 3A. In some other embodiments, as shown in FIG. 3C, a Descriptive Button 300 can include both textual description 302 and iconic description 304 together to refer to a Descriptive Group.

Figure 4:
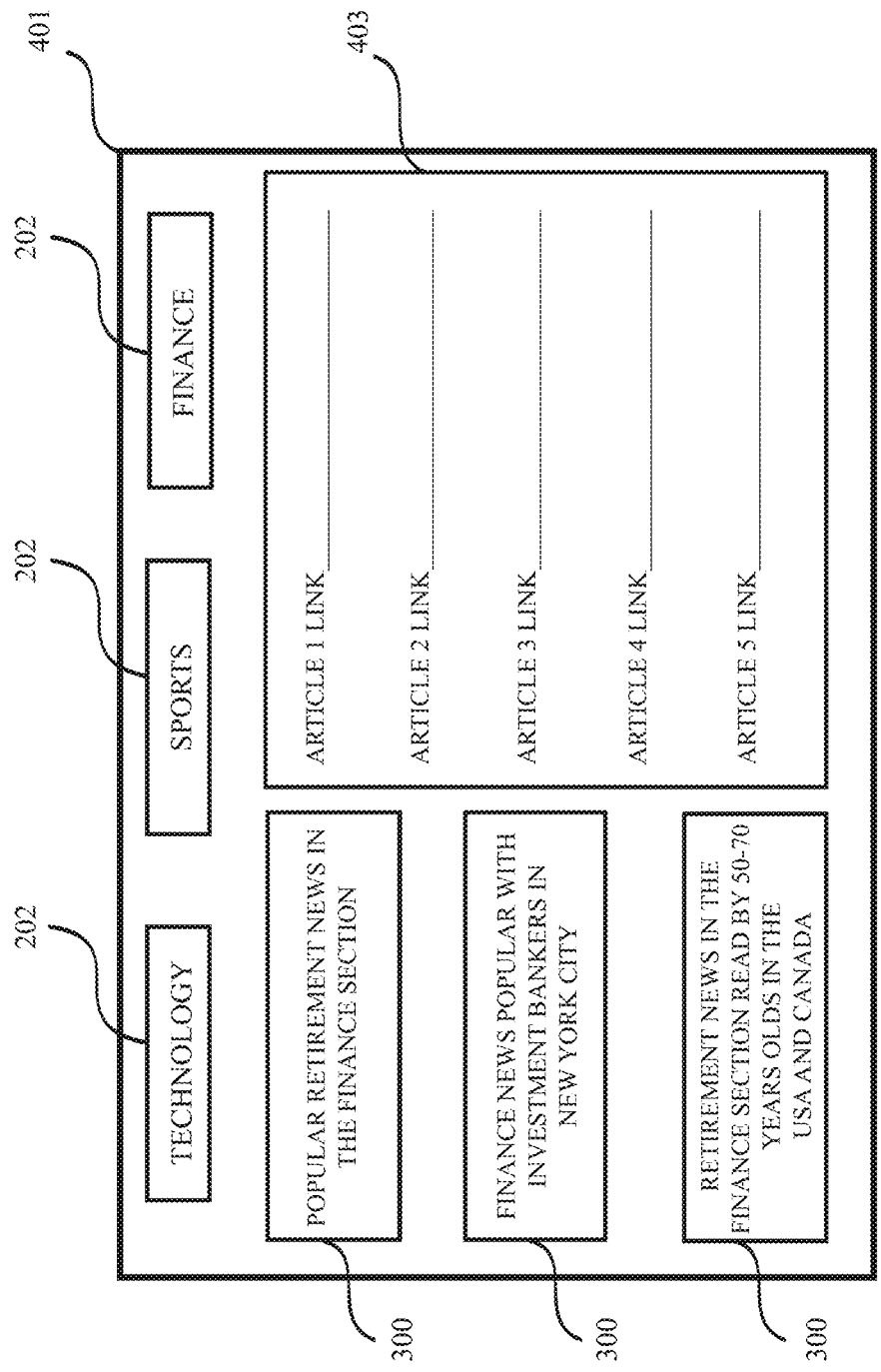
FIG. 4 illustrates an exemplary view of a webpage containing descriptive buttons in accordance with an embodiment of the present invention.
Figure 5:
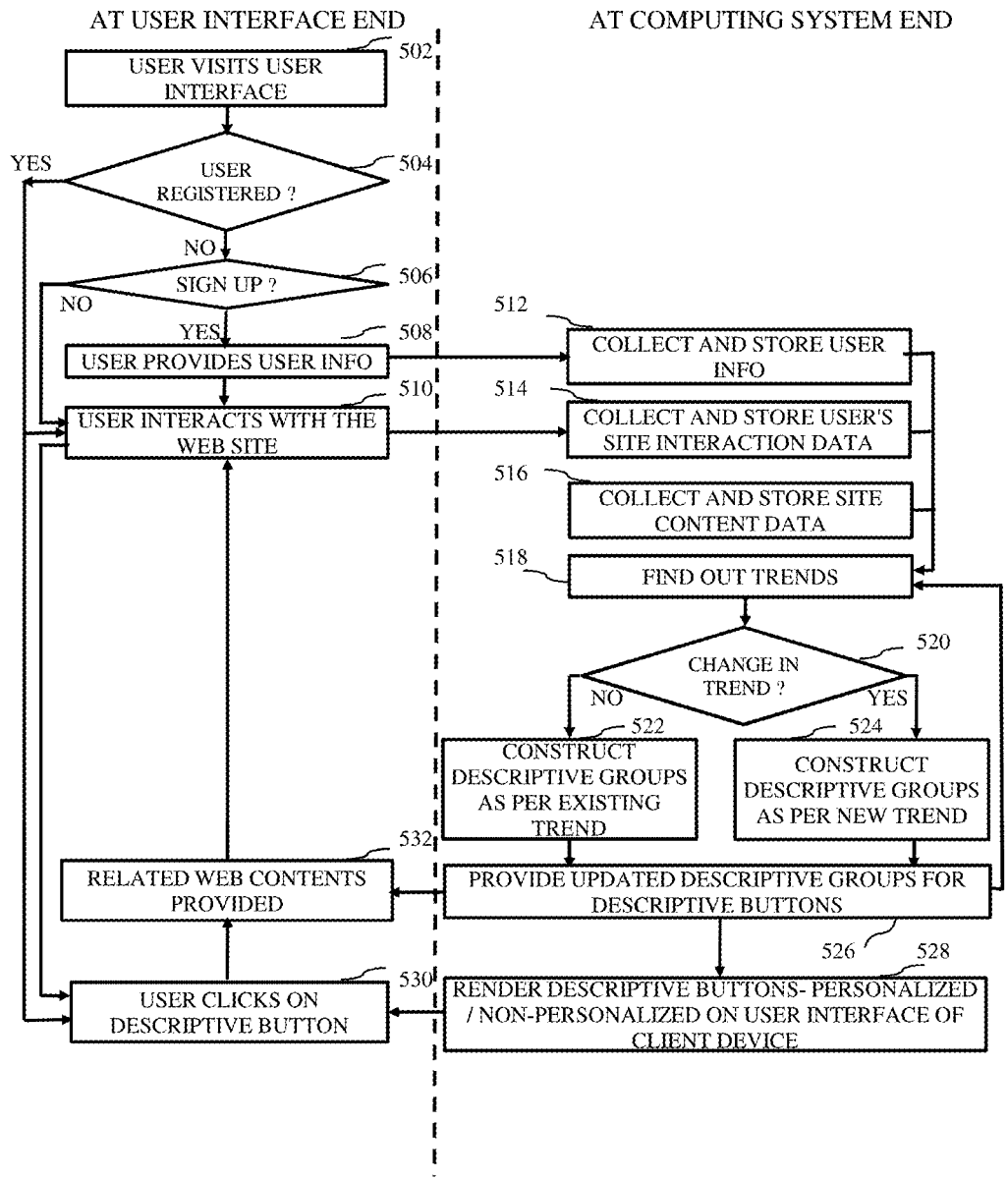
FIG. 5 is flow chart showing the general steps of a method in accordance with one or more embodiments of the present invention.

Accordingly, with one or more embodiments of the present invention, reference to FIG. 1, FIG. 4 and FIG. 5, a user 102 can be presented with a web page or user interface 401 on a client device 105 by the computing system 101 through network 110 when the user 102 visits a website as in step 502. In some embodiments, the Descriptive Buttons 300 can be made personalized according to the preference of the user 102. To personalize the Descriptive Buttons 300 it is required that the computing system 101 has the relevant information about the user 102. Therefore, as in step 506, the user 102 is offered with the option to sign up with the computing system 101 if the user 102 is not an already registered user as checked in step 504. If the user 102 is not a registered user and wishes to get registered with the computing system 101, the user 102 is presented with a form through the user interface 401 by means of which the user 102 can submit the relevant information such as age, gender, sex, profession, location etc. of the user to the computing system 101 as in step 508. Alternatively, in some other embodiments, the user 102 can also provide the relevant personal information to the computing system 101 by deciding to sign up using the user's social network credential or similar credentials from which the computing system 101 can extract the required information to personalize the Descriptive Buttons 300. Once the user 102 submits the necessary required information, the computing system 101 collects and stores the user information in the member profile data store 145 as in step 512. For example, if the user 102 is an Investment Banker from the New York City, the member profile data store 145 will log that information against user 102 provided the user 102 reveals such information to the computing system 101 through user interface 401 either implicitly or explicitly. Thus, member profile data store 145 hosts the profile information of all the registered users.

As in step 510, a user 102, whether registered or unregistered, can interact or browse the different content of a website and such information about the interaction or activity of a user with a website gets stored in the visitor site usage data store 150 as in step 514. For registered users, the site usage information is stored in the visitor site usage data store 150 against the identity of the user.

The computing system 101 also collects and hosts a database of all the relevant web contents of one or more websites in site content data store 160 as in step 516. Details about the web content can be items like taxonomy of the content displayed, key words of the content displayed, date the content was updated, colors of the images on the website, and so on.

In some preferred embodiments, using various methods known in the art, including mathematical and computer methods, the data stored in the data stores 145, 150 and 160 can be analyzed by the computer system 101, with the help of one or more processors 140, as in step 518, in within a single database or in all of the databases together, to identify which web content is relevant to a descriptive-group. A non-exhaustive list of examples of mathematical or computer methods that can identify descriptive-groups are: k-means clustering, multinomial regression, modal or aggregate count analysis, and many other methods known in the art. For the registered users, the personal information of the users would be taken into account to identify the descriptive groups relevant to the registered users, whereas, for unregistered users, such an analysis to identify the relevant descriptive groups would be done by considering the member profile data of the other registered users. That implies, in a preferred embodiment, as the computing system 101 would remain unaware of the preferences of an unregistered user, the most relevant/popular descriptive groups identified for the registered members would be considered for the unregistered users also.

Figure 6:
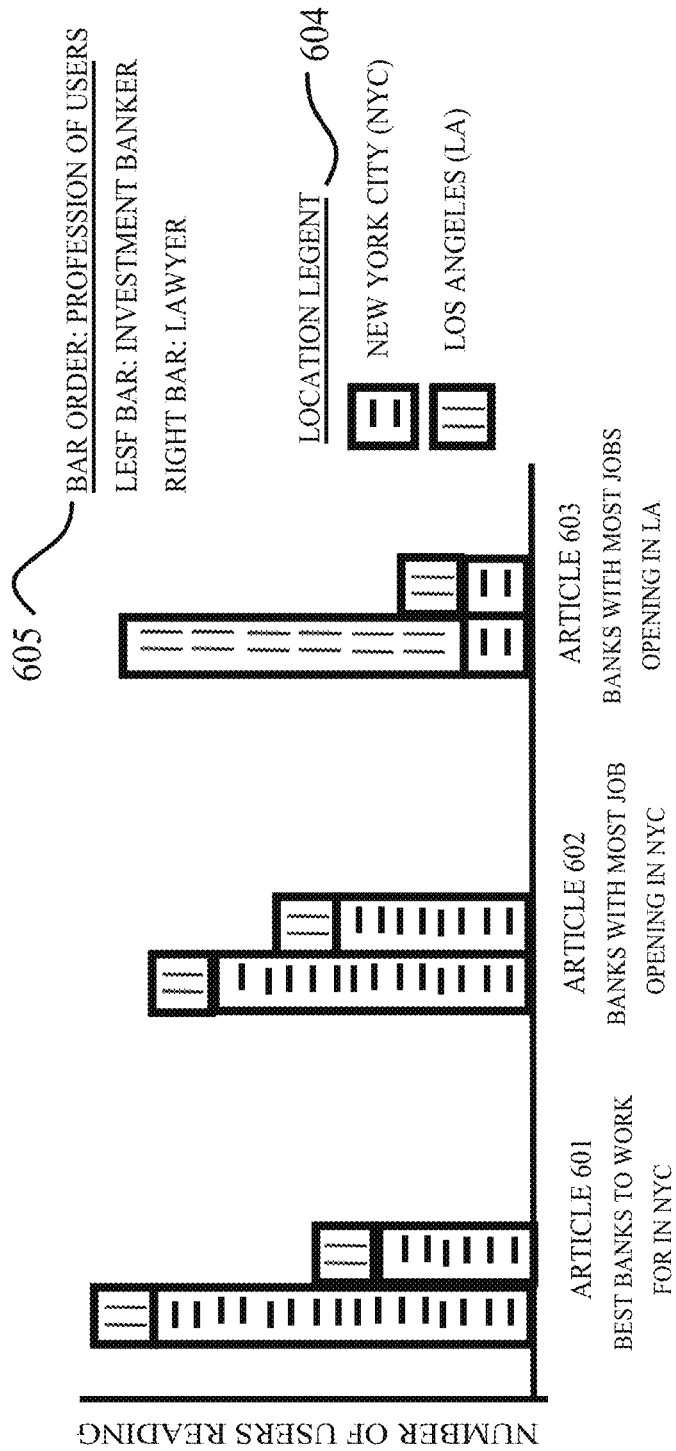
FIG. 6 illustrates an exemplary bar chart showing demographic trend among different users with respect to different web articles.

FIG. 6 illustrates an exemplary bar chart showing demographic trend in terms of popularity of different web articles among different users 102 with respect to location and profession of the users 102. This bar chart of FIG. 6 is provided to explain how an analysis is done by the one or more processors 140 in finding out the trends as in step 518 based on mathematical methods known in the art. In this example all the articles 601, 602, 603 are finance related articles. Site Content Data Store 160 can provide information that these web articles are finance related. Similarly, that the users 102 are Investment Bankers and Lawyers from New York City and Los Angeles can come from the member profile data store 145. In the same way, the information about the users 102 reading these articles 601, 602 and 603 on the web can come from the visitor site usage data store 160. In the present example, the article 601 titled "Best Banks to work for in NYC" and article 602 titled "Banks with most job opening in NYC" are found to be popular with the Investment Bankers from New York, but are not popular with the Investment Bankers from Los Angeles. The article 603 titled "Banks with most job openings in LA" is found to be popular with the Investment Bankers in Los Angeles but not with the Investment Bankers in New York. None of the articles are popular with Lawyers in either New York or Los Angeles.

The instruction stored in the memory of the computer server 135 and executed by the one or more processors 140 can identify that there is a trend in the data stored in the data stores 145, 150, and 160. In the example illustrated in FIG. 6 there are three descriptions about the trends identified. The first description is that the content is Finance related. The second description is that the content is popular with the Investment Bankers. The third description is that two of the articles 601, 602 are specifically popular with the Investment Bankers in New York City. The computing system 101 with the help of the one or more processors 140 of the computer server 135 could identify that the two articles 601, 602 should be in a descriptive-group labeled as "Finance news popular with Investment Bankers in New York City". The Descriptive-Group name and the two associated links of the web content i.e. links to the web articles 601 and 602 can be stored in a database 155 called Descriptive Buttons and Associated Content Data Store.

As in step 520, in a preferred embodiment, the computing system 101 keeps on checking the trends analyzed by the one or more processor 140 as in step 520. If no change in trend is found then the Descriptive Groups are constructed as per the existing trends as in step 522 and, if new trends are found during the analysis, then the Descriptive Groups are constructed as per the newly found trends as in step 524. The change in trend can be the result of change in data stored in any or all of the data stores 145, 150 and 160. The continuous monitoring of the analyzed trends and the corresponding changes resulting in the Descriptive Groups formed make the Descriptive Groups dynamic. That implies, the Descriptive Groups would change in real time corresponding to the changes occurring in the member profile information, user site usage and/or site content information. The updated Descriptive Groups, in terms of textual and iconic descriptions, and the associated links to the web contents are stored in the data store 155 as in step 526 and the Descriptive Buttons 300 are rendered on the user interface or web page 401 on the client device 105 based on these descriptions of the Descriptive Groups as in step 528. Depending on a trend a descriptive group can constitute a grouping of any kind of web content i.e. text content, audio content, video content, image content etc. available on the web.

As such, if the user 102 is a registered user of the computing system 101 and is an Investment Banker from New York City and logs in to a news website 401 the user 102 will be shown a personalized descriptive-button 300 titled "Finance news popular with Investment Bankers in New York City" as in step 528. By clicking on this descriptive button 300 as in step 530, the user 102 can be shown links to articles 601, 602 in the reading pane 403 that are most applicable to an Investment Banker from New York City as in step 532. Upon clicking on the descriptive button the web contents associated with the descriptive button 300 can be presented on the user interface in a ranked form according to popularity or in random manner according to the preferences of the user 102.

In a similar manner, if this same individual user 102 is 55 years old and such an information was revealed by the user to the computing system 101, the user can be shown another personalized descriptive-button 300 labeled "Retirement news in the finance section read by 50-70 year olds in the USA & Canada".

On the other hand, if the user 102 is an Investment Banker from New York City but is not registered with the computing system 101, meaning the computing system is not aware of such information about the user 102, then, on visiting the web page 401, the Descriptive Buttons 300 displayed on the user device 105 would be the ones most relevant for the majority of the other users.

This example illustrates how descriptive buttons can benefit visitors to a website by showing more personalized information. Those skilled in the art would readily recognize that there are many ways and methods to find descriptive-groups and present the information as a single descriptive-button. Those skilled in the art would also recognize that a descriptive-button has a plurality of descriptions on a single descriptive-button.

In some embodiments, the Descriptive Buttons 300 of the present invention can be shown together with the conventional buttons 202 on a web page or, in some other embodiments, the relevant Descriptive Buttons 300 can be displayed once a user clicks on a particular conventional button 202. In some embodiments, only the Descriptive Buttons 300 can be displayed without displaying the conventional buttons 202 on a client device.

The interaction of the user 102 with a website, either through the Descriptive Buttons 300 or otherwise, gets updated in the user site usage data store 150. It would be obvious to those skilled in the art that, although only three descriptive buttons 300 are shown in the example disclosed herein, there can be any number of descriptive buttons displayed on the user interface or web page of website on a client device 102 according to suitability.

A non-exhaustive list of examples of websites that can use Descriptive-Buttons 300 (and what their Descriptive-Groups could be) is provided below 1. News websites (retirement articles in the finance section read by 50-70 year olds in the USA and Canada, popular technology articles being shared today in Silicon Valley, articles read by the CEO's of the world's largest manufacturing companies based in the US)

2. Shopping websites (red color dresses bought by women between the age of 20 and 30 in Los Angeles, popular outdoor clothing for infants bought in Chicago in the Fall and Winter Season, drought resistance plants rated at least 4 stars by Texas residents)

3. Vacation Travel Websites (International honeymoon packages under $5000 popular with 20 to 30 year olds living in Florida, Europe travel packages for new graduates under $2000 for Summer 2017)

4. Health Websites (articles read by 20-30 year old males trying to lose weight, popular articles read by 30-40 year old females who are vegetarian and trying to lose weight)

If the Descriptive-Button 300 discussed in the example above is clicked by a user, the user is presented multiple links that match the multiple descriptions identified in the Descriptive-Group.

Those skilled in the art would readily recognize that numerous variations of Descriptive-Buttons 300 can be formed to improve the efficiency of a website and to improve and personalize the website user experience, and that the present invention is not limited to those described above.

The Descriptive-Group examples above have presented the multiple descriptions in a cohesive manner. The Descriptive-Group can also be presented in a non-cohesive manner. The following non-exhaustive list illustrates how a single non-cohesive Descriptive-Group could be labeled in various manners:

1. Red Dresses—bought—by Women—min age 20 max age 30—Los Angeles

2. Woman—Min Age 20—Max age 30—Los Angeles—Bought—Red—Dresses

3. Min age 20 & Max age 30 & Los Angeles & Woman & Red & Dresses & Bought

Those skilled in the art would appreciate that there are many ways to present the same Descriptive-Group and the present invention is not limited to the combination methods discussed in the non-exhaustive examples discussed above.

Figures 7A, 7B:
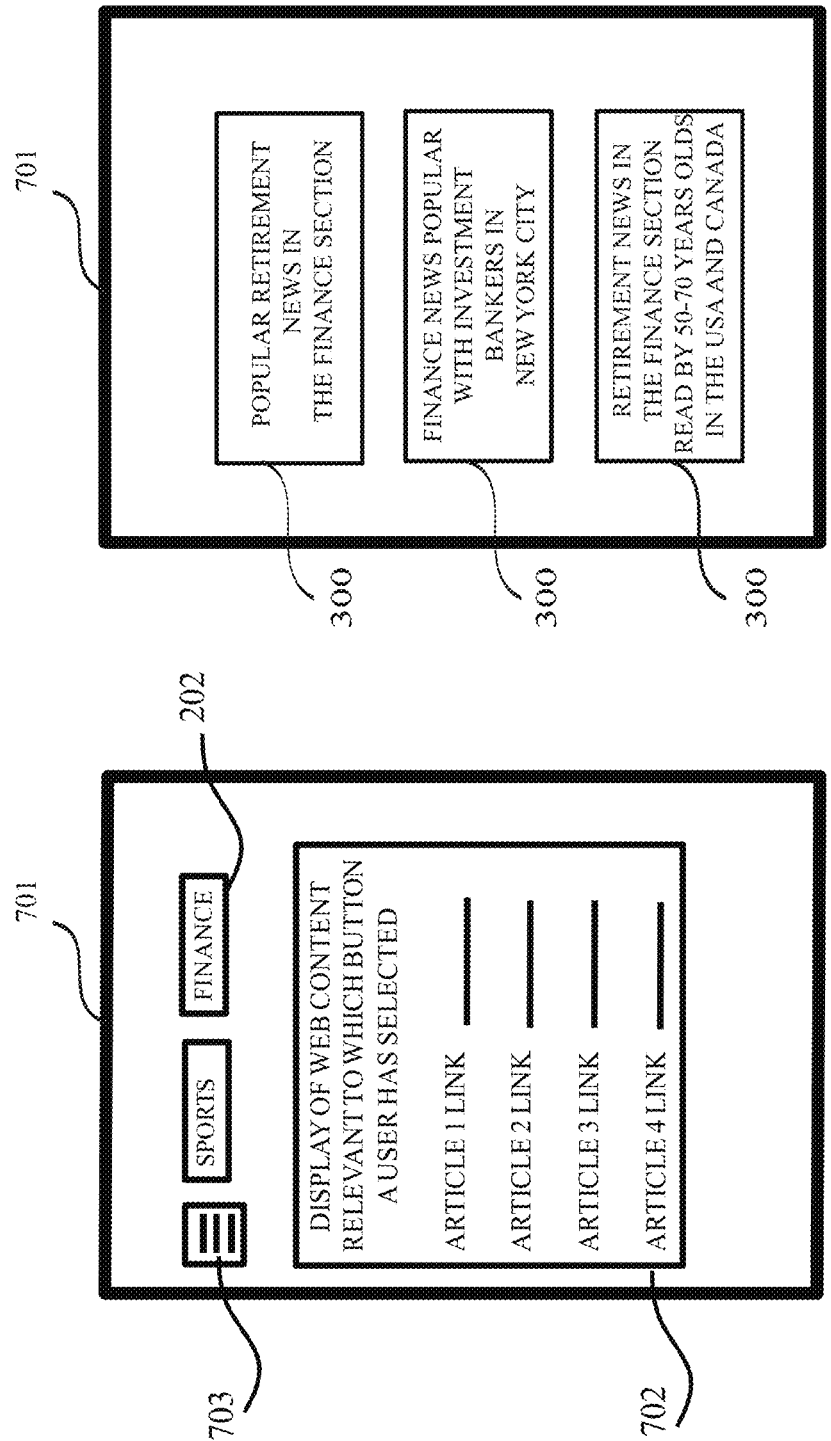
FIG. 7A illustrates an exemplary web page in mobile format in accordance with an embodiment of the present invention.
FIG. 7B illustrates an exemplary web page in mobile format with descriptive buttons in accordance with an embodiment of the present invention.

The presentation of the information is not limited to websites on laptop or desktop computer. In some embodiments, the descriptive buttons 300 of the present invention can also be presented in a mobile format. FIG. 7A shows an exemplary mobile format 701 of the news website. If a user clicks on the button labeled "Finance" 202 the user will be shown finance related articles in the reading pane 702. If the user clicks on the Options button 703, the user will be shown descriptive buttons 300 either personalized or non-personalized as shown in FIG. 7B. For example, the user can be shown a descriptive button 300 titled "Popular retirement news in the Finance Section". If the user clicks on this button the user will be shown popular retirement news from the finance section in the reading pane 702.

The abovementioned description of the embodiments of the invention has been presented for the purpose of illustration. It is not intended to be exhaustive or to limit the invention to the exact forms disclosed. Persons skilled in the relevant art can appreciate that many adjustments and variations are possible in-light of the above disclosure.

Some portions of this description describe the embodiments of the invention in terms of computer or mathematical methods of operations on data. These representations are commonly used by those skilled in the data processing arts to convey the essence of their work effectively to others skilled in the art. These methods are understood to be implemented by computer programs or equivalent electrical circuits, microcode, or the like. Furthermore, it has also proven convenient at times, to refer to these methods as algorithms or machine learning or "Big Data Analysis" or "Deep Data Analysis", without loss of generality. The described methods may be embodied in software, firmware, hardware, or any combinations thereof.

Any of the steps, methods, operations, or processes described herein may be performed or implemented with one or more hardware or software modules, alone or in combination with other devices.

Flowchart is used to describe the steps of the present invention. While the various steps in this flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowchart may be included in performing this method. Accordingly, the specific arrangement of steps shown in FIG. 5 should not be construed as limiting the scope of the invention.

Finally, the language used for the disclosure of the invention has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for improving website navigation by displaying a plurality of descriptive buttons on a user interface presented on a client device by a computing system, said computing system comprising one or more data stores and one or more processors, wherein said client device and said computing system are communicatively connected through a network and said computing system is operable to respond to one or more instructions, said method comprising the steps of:

maintaining one or more databases by said computer system in said one or more data stores, said one or more databases comprising a plurality of data related to a plurality of web sites, a plurality of data related to information on a plurality of users including a first user of said plurality of websites and a plurality of data related to interactions of said plurality of users including the first user with said plurality of web sites;

analyzing said one or more databases by said computer system to find out a plurality of trends including a first trend and a second trend present at a given point in time;

identifying a first-relevant web content from said plurality of web sites corresponding to said first trend and a second-relevant web content from said plurality of web sites corresponding to said second trend, the first relevant web content different from the second relevant web content;

identifying a first subset of a plurality of keywords corresponding to said first trend and a second subset of the plurality of keywords corresponding to said second trend, the plurality of keywords comprising of a plurality of interests and attributes of the first user, the second subset different from the first subset;

generating a first descriptive group comprising said first subset of the plurality of keywords and a second descriptive group comprising said second subset of the plurality of keywords by said computer system;

rendering a first descriptive button and a second descriptive button on said client device through said user interface wherein the first the first relevant web content, and the second descriptive button displays the second descriptive group and is associated with one or more links to the second relevant web content;

and presenting said one or more links to said first relevant web content or said one or more links to said second relevant web content on said client device in response to respective activation of said first or second descriptive button by said first user.

2. The method as in claim 1, wherein each plurality of keywords of each descriptive group displayed on each descriptive button are a plurality of textual descriptions.

3. The method as in claim 1, wherein each plurality of keywords of each descriptive group displayed on each descriptive button are a plurality of graphical descriptions.

4. The method as in claim 1, wherein each plurality of keywords of each descriptive group displayed on each descriptive button are a combination of textual and graphical descriptions.

5. The method as in claim 1, wherein said generation of each descriptive group is dynamic corresponding to change in each plurality of keywords with respect to a change in each respective trend.

6. The method as in claim 1, wherein said one or more links to each relevant web content are presented on said client device in a ranked order.

7. The method as in claim 1, wherein said one or more links to each relevant web content are presented on said client device in a random order.

* * * * *